US012810342B2

(12) United States Patent
Mahajan et al.

(10) Patent No.: US 12,810,342 B2
(45) Date of Patent: Nov. 24, 2026

(54) TECHNIQUES FOR GENERATING AN AUGMENTED REALITY / VIRTUAL REALITY TRAVEL ITINERARY

(71) Applicant: Barclays Services Corporation, New York, NY (US)

(72) Inventors: Shrey Mahajan, Jersey City, NJ (US); Aritra Roychoudhury, Morris Plains, NJ (US); Bethany Mckelvey, Newark, DE (US); Allison Keevil, West Grove, PA (US); Sean H. Murray, West Chester, PA (US)

(73) Assignee: Barclays Services Corporation, New York, NY (US)

( * ) Notice: Subject to any disclaimer, the term of this patent is extended or adjusted under 35 U.S.C. 154(b) by 52 days.

(21) Appl. No.: 18/791,150

(22) Filed: Jul. 31, 2024

(65) Prior Publication Data

US 2026/0038029 A1 Feb. 5, 2026

(51) Int. Cl.
*G06Q 30/06* (2023.01)
*G06F 3/01* (2006.01)
(Continued)

(52) U.S. Cl.
CPC ........ *G06Q 30/06311* (2025.08); *G06F 3/011* (2013.01); *G06Q 30/0631* (2013.01); *G06Q 50/14* (2013.01); *G06T 2200/24* (2013.01)

(58) Field of Classification Search
CPC ........... G06Q 30/031; G06Q 30/06311; G06Q 50/14; G06F 3/011; G06T 2200/24
(Continued)

(56) References Cited

U.S. PATENT DOCUMENTS 9,619,831 B1 * 4/2017 Kumar ............... G06Q 30/0264
10,706,453 B1 * 7/2020 Morin ...................... G06N 5/01
(Continued)

FOREIGN PATENT DOCUMENTS

JP 2017228040 A * 12/2017 ............. G06Q 30/02
KR 102222392 B1 * 3/2021 ............. G06Q 20/24
WO WO-2016189370 A1 * 12/2016 ........... A61B 5/0024

OTHER PUBLICATIONS

L. Soni and A. Kaur, "Immersive Journeys: Unveiling Historical Places through Virtual Reality," 2023 International Conference on System, Computation, Automation and Networking (ICSCAN), Puducherry, India, 2023, pp. 1-6, retrieved from IP. Com on Nov. 13, 2025 (Year: 2023).*

(Continued)

*Primary Examiner* — Yogesh C Garg
(74) *Attorney, Agent, or Firm* — Wilmer Cutler Pickering Hale and Dorr LLP

(57) ABSTRACT

Techniques for providing an immersive simulation of an itinerary comprise systems, methods and storage mediums. A system for providing an immersive simulation of an itinerary may comprise memory storing instructions and one or more processors communicatively coupled to a network. The one or more processors may be configured to execute the instructions to: acquire historical transaction data of a financial account, provide the historical transaction data to an enterprise AI platform to generate one or more personalized recommendations for the itinerary based on the historical transaction data, receive triggering data indicating a transaction of the financial account for a product and/or service, generate the immersive simulation including the one or more personalized recommendations, generate a link to the immersive simulation that is executable by a device, and provide at least one package over the network.

20 Claims, 8 Drawing Sheets

200

(51) Int. Cl.
*G06Q 30/0601* (2023.01)
*G06Q 50/14* (2012.01)

(58) Field of Classification Search
USPC .......................................................... 705/26.7
See application file for complete search history.

(56) References Cited

U.S. PATENT DOCUMENTS

| | | | | |
|---|---|---|---|---|
| 2017/0153483 | A1* | 6/2017 | Wu | G02F 1/13394 |
| 2021/0174492 | A1* | 6/2021 | Karaaslan | G06T 7/11 |
| 2021/0326920 | A1* | 10/2021 | Yucra Rodriguez | G06Q 30/0233 |
| 2021/0342754 | A1* | 11/2021 | Baalbergen | G06Q 10/025 |
| 2025/0321116 | A1* | 10/2025 | Gupta | G06T 19/006 |

OTHER PUBLICATIONS

M. Sharma et al., "Virtual Reality in Tourism Industry within the Framework of Virtual Reality Markup Language," 2024 IEEE 3rd World Conference on Applied Intelligence and Computing (AIC), Gwalior, India, 2024, pp. 274-279, retrieved from IP. Com on Nov. 13, 2025. (Year: 2024).*

B. Xu and Y. Yu, "A Personalized Assistant in 3D Virtual Shopping Environment," 2010 Second International Conference on Intelligent Human-Machine Systems and Cybernetics, Nanjing, China, 2010, pp. 266-269,, retrieved from IP.Com on Jul. 8, 2026 (Year: 2010).*

* cited by examiner

TECHNIQUES FOR GENERATING AN AUGMENTED REALITY / VIRTUAL REALITY TRAVEL ITINERARY

FIELD OF THE DISCLOSURE

The present disclosure relates generally to Artificial Intelligence (AI) and Machine Learning (ML), and more particularly, to techniques for providing an immersive simulation of an itinerary.

BACKGROUND OF THE DISCLOSURE

Planning travel or a large purchase often causes stress to a consumer in deciding which option is the best for them, causing the consumer to either overspend or underutilize offers and other available benefits.

Loyalty credit card programs provide consumers with bonus earnings from purchases. However, maximizing the value of those earnings is often challenging for the consumer, especially when accounting for multiple purchases from different brands, sellers, or companies.

Co-branded credit cards from financial service providers generate rewards points that consumers may redeem at a discount from a partner of the provider or redeem as statement credits provided back to the consumer. However, consumers are limited to redeeming their earned points at the partner's discretion, thereby diminishing the value of the points across brands not owned or controlled by the partner.

Websites that aggregate car rentals, flights, hotels and other types of travel-related necessities provide consumers with automatically generated itineraries or travel packages. Instead of easing the burden on the consumer regarding a decision of which options to purchase, these itineraries often waste the consumer's time by providing options that are unsuitable for the consumer's tastes or budget.

In view of the foregoing, it may be understood that there may be significant problems and shortcomings associated with current itinerary generation technologies.

SUMMARY OF THE DISCLOSURE

Techniques for providing an immersive simulation of an itinerary are disclosed. In one particular embodiment, the techniques may be realized as a system for providing an immersive simulation of an itinerary. The system may comprise a memory storing instructions and one or more processors communicatively coupled to a network. The one or more processors may be configured to execute the instructions to: acquire historical transaction data of a financial account, provide the historical transaction data to an enterprise artificial intelligence (AI) platform to generate one or more personalized recommendations for the itinerary based on the historical transaction data, receive triggering data indicating a transaction of the financial account for a product or service, generate the immersive simulation including the one or more personalized recommendations, the immersive simulation including a simulation program of the product and/or service that is at least one of a Virtual Reality program, an Augmented Reality program, and a Mixed Reality program, generate a link to the immersive simulation that is executable by a device, and provide at least one package over the network, the at least one package including the link and a cost associated with the itinerary.

In accordance with other aspects of this particular embodiment, the device may comprise at least one display screen and may be configured to execute the simulation program upon the link being selected.

In accordance with further aspects of this particular embodiment, the device may be one of a headset computer where the at least one display screen is positioned behind a lens, a tablet computer where the at least one display screen is a touchscreen, and a smartphone where the at least one display screen is a touchscreen.

In accordance with additional aspects of this particular embodiment, the at least one package may comprise a plurality of packages, the itinerary may be included in a plurality of itineraries, and the one or more processors may be further configured to execute the instructions to: provide the historical transaction data to the enterprise AI platform to generate the one or more personalized recommendations for each of the plurality of itineraries, at least one of the one or more personalized recommendations being different between each itinerary of the plurality of itineraries, and provide the plurality of packages over the network.

In accordance with other aspects of this particular embodiment, the system may comprise a data storage, wherein the one or more processors may be further configured to execute the instructions to: acquire the historical transaction data from the data storage, and acquire real-time data from one or more sources of customer interactions using an Application Programming Interface (API).

In accordance with further aspects of this particular embodiment, the one or more sources of customer interactions may comprise at least one of a chat interface, a website, and a platform for processing payments.

In accordance with additional aspects of this particular embodiment, the real-time data acquired by the API may comprise data generated from a plurality of user searches performed by a user.

In accordance with other aspects of this particular embodiment, the one or more processors may be further configured to execute the instructions to generate the cost in one or more of rewards points, a digital currency, and a fiat currency.

In accordance with further aspects of this particular embodiment, the one or more processors may be further configured to execute the instructions to provide the at least one package over the network as one or more of an email, a text, and a notification.

In accordance with additional aspects of this particular embodiment, the one or more processors may be further configured to execute the instructions to: generate the simulation program of the product or service to include a graphical object and/or a graphical environment representing the product or service on the at least one display, and generate the graphical object and/or the graphical environment to correspond with a physical distance, pose, and size of the graphical object and/or the graphical environment.

In accordance with other aspects of this particular embodiment, the graphical object and/or the graphical environment may be a digital representation of one or more of an airline seat, a cruise ship cabin, a hotel room, or a vehicle, and the one or more processors may be further configured to execute the instructions to: adjust an appearance of the digital representation on the at least one display screen in real-time to correspond with a physical distance, pose, and size of the graphical object and/or the graphical environment.

In accordance with further aspects of this particular embodiment, the enterprise AI platform may execute one or more classification algorithms and one or more clustering algorithms, and the one or more processors may be further configured to execute the instructions to: provide the historical transaction data to the enterprise AI platform to generate the one or more personalized recommendations for the itinerary by applying the one or more classification algorithms and one or more clustering algorithms to the historical transaction data.

In accordance with additional aspects of this particular embodiment, the one or more processors may be further configured to execute the instructions to provide the historical transaction data to the enterprise AI platform to generate the one or more personalized recommendations for the itinerary by applying a User Based Collaborative Filtering (UBCF) process and/or an Item Based Collaborative Filtering (IBCF) process.

In accordance with other aspects of this particular embodiment, the financial account may be linked to a credit card and the historical transaction data includes one or more purchases made using the credit card.

In accordance with further aspects of this particular embodiment, the financial account may be linked to a digital representation of the credit card and the historical transaction data includes one or more purchases made using the digital representation of the credit card.

In accordance with additional aspects of this particular embodiment, the triggering data may be received prior to the transaction of the financial account for the product and/or service.

In accordance with other aspects of this particular embodiment, the triggering data may be received subsequent to the transaction of the financial account for the product and/or service.

In accordance with further aspects of this particular embodiment, the triggering data may be received responsive to the product and/or service being placed in an online checkout.

In accordance with additional aspects of this particular embodiment, the immersive simulation may be generated based on the historical transaction data and transaction of the financial account is included in the historical transaction data.

In another particular embodiment, the techniques may be realized as a method of providing an immersive simulation of an itinerary over a network, the method comprising acquiring historical transaction data of a financial account, providing the historical transaction data to an enterprise artificial intelligence (AI) platform to generate one or more personalized recommendations for the itinerary based on the historical transaction data, receiving triggering data indicating a transaction of the financial account for a product and/or service, generating the immersive simulation including the one or more personalized recommendations, the immersive simulation including a simulation program of the product or service that is at least one of a Virtual Reality program, an Augmented Reality program, and a Mixed Reality program, generating a link to the immersive simulation that is executable by a device, and providing at least one package over the network, the at least one package including the link and a cost associated with the itinerary.

In accordance with other aspects of this particular embodiment, the at least one package may comprise a plurality of packages, the itinerary may be included in a plurality of itineraries, and the method may comprise: providing the historical transaction data to the enterprise AI platform to generate the one or more personalized recommendations for each of the plurality of itineraries, at least one of the one or more personalized recommendations being different between each itinerary of the plurality of itineraries, and providing the plurality of packages over the network.

In accordance with further aspects of this particular embodiment, the method may comprise acquiring the historical transaction data from a data storage, and acquiring real-time data from one or more sources of customer interactions using an Application Programming Interface (API).

In accordance with additional aspects of this particular embodiment, the method may comprise generating the cost in one or more of rewards points, a digital currency, and a fiat currency.

In accordance with other aspects of this particular embodiment, the method may comprise providing the at least one package over the network as one or more of an email, a text, and a notification.

In accordance with further aspects of this particular embodiment, the method may comprise providing the historical transaction data to the enterprise AI platform to generate the one or more personalized recommendations for the itinerary by applying a User Based Collaborative Filtering (UBCF) process and/or an Item Based Collaborative Filtering (IBCF) process.

In accordance with other aspects of this particular embodiment, the method may comprise linking the financial account to a credit card, wherein the historical transaction data includes one or more purchases made using the credit card.

In accordance with further aspects of this particular embodiment, the method may comprise linking the financial account to a digital representation of the credit card, wherein the historical transaction data includes one or more purchases made using the digital representation of the credit card.

In accordance with additional aspects of this particular embodiment, the method may comprise receiving the triggering data prior to the transaction of the financial account for the product and/or service.

In accordance with other aspects of this particular embodiment, the method may comprise receiving the triggering data subsequent to the transaction of the financial account for the product and/or service.

In accordance with further aspects of this particular embodiment, the method may comprise receiving the triggering data responsive to the product and/or service being placed in an online checkout.

In accordance with additional aspects of this particular embodiment, the method may comprise generating the immersive simulation may be generated based on the historical transaction data, wherein the transaction of the financial account is included in the historical transaction data.

In another particular embodiment, the techniques may be realized as at least one processor readable storage medium storing a computer program of instructions configured to be readable by at least one processor for instructing the at least one processor to execute a computer process for performing the method.

In another particular embodiment, the techniques may be realized as a non-transitory computer readable medium storing a computer program of instructions configured to be executed by one or more processors of the system to execute a computer process for performing the method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Planning travel or a large purchase often causes stress, leaving consumers unsure if the choices selected are the best option possible. Loyalty credit card programs often provide consumers with bonus earn, but it's difficult to maximize value. Many loyalty card customers never use offers available to them and instead use rewards for statement credits, providing lower value than redemption of points.

Techniques described herein offer an immersive (e.g., Augmented Reality, Virtual Reality, Mixed Reality) simulation of a customer's card transactions including personalized itineraries tailored to their interests based on their previous transactions. Upon a purchase made with the card, an enterprise AI platform activates to create personalized content and a custom link to a virtual environment. Within the virtual environment, customers can experience the dimensions of their purchased plane seat, hotel room, cruise cabin, or even walk into their future restaurant reservation using an avatar customized to their physical features.

Current itinerary generation technologies present significant drawbacks to customers such as presenting options that are not likely to be purchased due to not matching the tastes and preferences of customers and/or not maximizing the value of any accumulated rewards points. To improve the usefulness of automatically generated itineraries to both the customer and any organization offering goods or services to be included in a customer's travel plans, embodiments described herein leverage a technology framework based on workflows including an Enterprise AI platform that generates and communicates immersive travel itineraries and personalized content to customers.

Figure 1A:
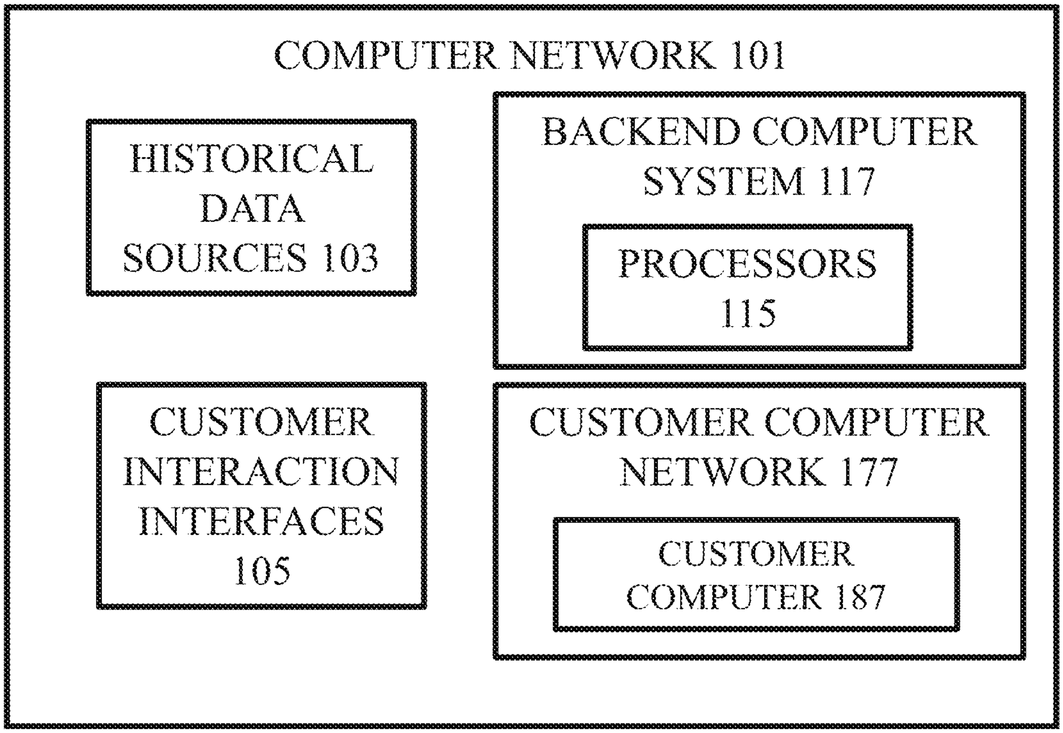
FIG. 1A shows a computer network in accordance with an embodiment of the present disclosure.

Referring to FIG. 1A, there is shown a computer network 101 that receives data from one or more historical data sources 103 and one or more customer interaction interfaces 105. The one or more historical data sources 103 provide information related to or useful for learning more about customers based on previous transactions or activity. For example, the one or more historical data sources 103 provide content that is ingested by one more data models that receive the content over the network 101 (e.g., wide-area network (WAN), distributed network). The models are stored and executed by one or more processors 115 included in a backend computer system 117. In at least one example, the backend computer system 117 is operated by a financial services provider (e.g., bank) and the one or more historical data sources 103 are controlled by the provider and/or a partner entity/organization/company of the provider. In one example, the financial services provider is a bank, the partner is an airline, and the bank provides a financial account to customers. The financial account is linked, in certain examples, to a financial instrument that earns the customers rewards points useable with the bank or the airline. The financial instrument is, in certain examples, a debit card or a credit card. A customer may use their credit card (e.g., a co-branded credit card) or a digital representation of their credit card (e.g., a digital wallet) to make purchases where the funds are provided from the financial account linked to the card.

The historical data provided by the historical data sources 103 is, in at least some examples, partially or entirely maintained internally within the backend computer system 117. In an example, historical data is obtained from the historical data sources 103 and stored as an internal database in a repository or data storage within the backend computer system 117. Storing data in an internal database provides backend computer system 117 the ability to train models at any desired rate.

The one or more customer interaction interfaces 105 provide the backend computer system 117 with connections to sources of live or real-time customer interaction data provided by customers interacting with the customer interaction interfaces 105. In an example where the backend computer system 117 is operated by a bank that has created the co-branded credit card with the partner airline, the customer interaction interfaces 105 include one or more of a website operated by the airline where customers can purchase plane tickets, a website operated by the bank where customers can access the account tied to their co-branded credit card, a chat interface or channel connected to a chat platform operated by the airline, or a platform for processing payments. The customer interaction data may be obtained through a set of rules and protocols for interacting with software applications (i.e., an Application Programming Interface (API)). An API is well suited for communicating with different software systems and efficiently sharing data.

The computer network 101 includes a customer computer network 177. The customer computer network 177 includes a customer computer 187. While the backend computer system 117 may communicate with the customer computer 187 over the computer network 101, in at least some examples, the customer computer 187 is physically located at a significant distance from where the backend computer system 117 is physically located. In certain embodiments, the backend computer system 117 can communicate with the customer computer 187 directly over the computer network 101. In an example, the backend computer system 117 generates a digital link that is selectable by a customer to take the customer on a journey through an immersive travel itinerary, where the link is sent directly to the customer computer 187 bypassing the customer computer network 177. In another example, the link is sent to the customer computer network 177 before being sent to the customer computer 187.

As described above, a financial services provider such as a bank may create a co-branded credit card with a partner entity such as an airline. However, in some scenarios, neither the provider nor the partner manufacture devices capable of presenting the immersive itinerary to the user. For example, a third entity may be a company that manufactures Virtual Reality (VR) headsets that may or may not include exterior-mounted cameras to obtain image data of the surrounding environment to blend together with the Virtual Reality experience portrayed on one or more display screens (e.g., in a Mixed Reality (MR) experience). The one or more display screens may include special lenses including, but not limited to aspheric lenses or Fresnel lenses that magnify and focus the display images to create an immersive virtual experience.

A suitable headset for executing simulations described herein may include one or more sensors, such as an accelerometer, gyroscope, image sensor, infrared sensor, hand controllers, or the like to track the movement of the wearer as they move about in the physical/real world to replicate that movement in real-time or with minima latency as a digital/virtual world presented to the wearer through one or more lenses and display screens of the headset. The customer computer 187 is not limited to headset, but the same principles of operation described herein are applicable to mobile devices (e.g., smartphones, laptops, and tablets) that are capable of delivering AR, MR, or Augmented Reality (AR) immersive experiences as described herein.

Figure 1B:
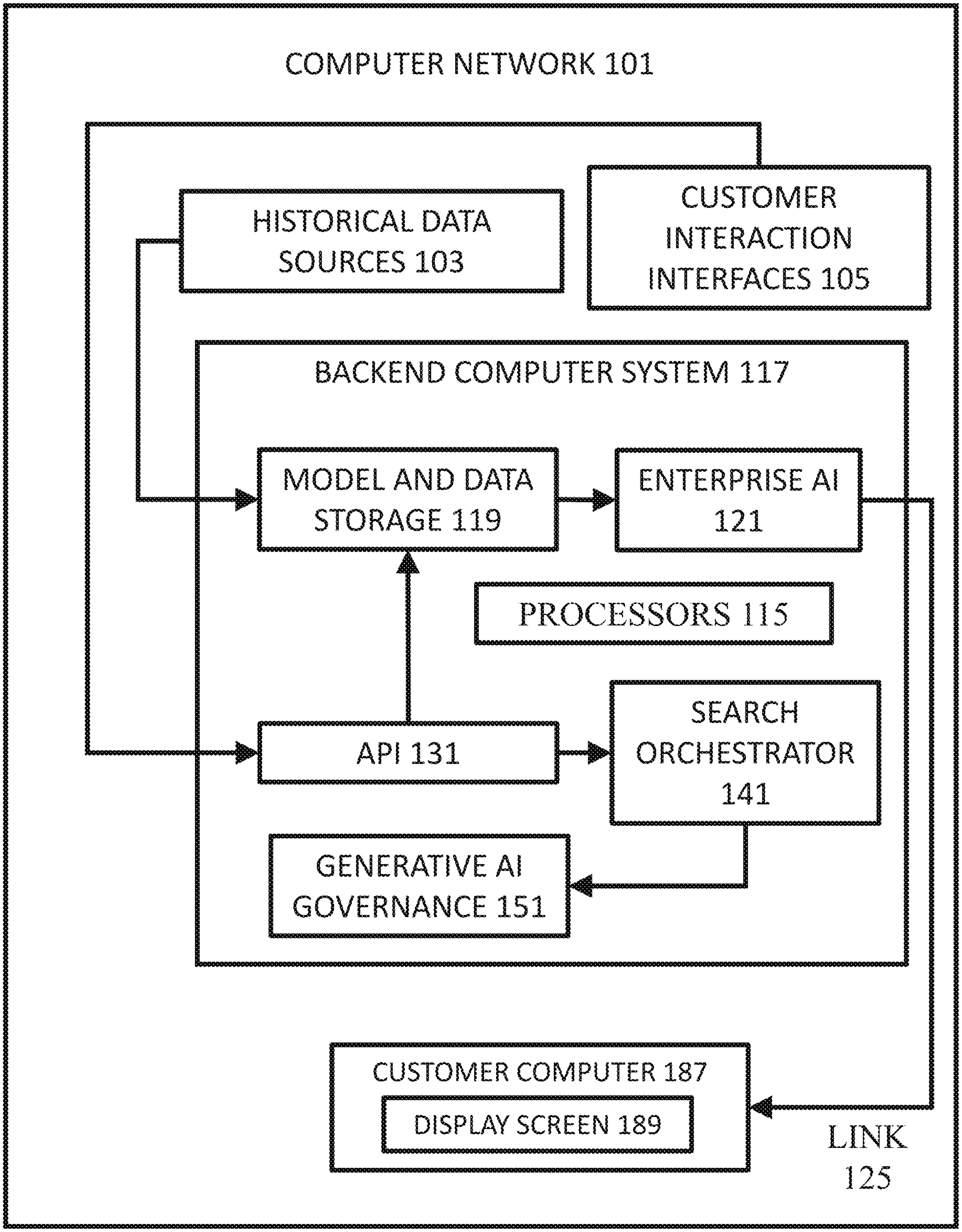
FIG. 1B shows a backend computer system in accordance with an embodiment of the present disclosure.

FIG. 1B shows the backend computer system 117 providing a link 125 to the customer computer 187. The link 125, when executed or otherwise selected by a user of the customer computer 187 or by the customer computer 187 itself, initiates a program that is executed by one or more processors within the customer computer 187 to execute an immersive itinerary as described herein.

The backend computer system 117 includes a model and data storage 119. The model and data storage 119 is configured to store data obtained from the historical data sources 103, the customer interaction interfaces 105, and/or other data obtained or generated by the backend computer system 117 or one of its components. Also included in the backend computer system 117 are an enterprise AI platform 121, an API 131, a search orchestrator 141, and generative AI governance 151. The enterprise AI platform 121 may include a generative AI application, model, algorithm, program, and/or or platform. The enterprise AI 121 may include a large language model (LLM). A large language model, as used in certain embodiments, may be trained and/or re-trained on one or more of natural language text, text derived from speech, click activity on a website or mobile application, a sequence of user actions, and financial data (e.g., prices of items over time, stock price).

In addition to providing the link 125, the enterprise AI platform 121, in some examples, combines the link with other information associated with one or more itineraries. For example, the enterprise AI platform 121 may provide a package to the customer computer 187 or other device associated with the customer (e.g., a desktop computer with access to the customer's email account), where the package contains the link to an itinerary, a cost associated with the itinerary, and one or more recommendations that populate the itinerary. The cost may be presented in one or more formats including rewards points or tokens, a digital currency (e.g., cryptocurrency), and/or or a fiat currency (e.g., U.S. Dollars). The package may include some or part of a response produced by the enterprise AI platform 121 based on a generative AI program that uses an LLM. The LLM is trained, in certain embodiments, on prompt data provided by customers to better personalize responses provided by the enterprise AI platform 121 to the customers. The prompt data may be provided from transaction data, chat data, or click data, for example. Accordingly, in one example the customer purchases a plane ticket from an airline website with their co-branded credit card and then automatically through the website, for example in a chat window or popup, the customer is presented with a response produced by the Generate AI program based on a prompt including the customer's transaction for the ticket. The response may include an output such as, "Thank you for booking a flight on XYZ airlines with your ABC Bank card. Click here [link] to see a suggested itinerary your trip that you can add on right now for only 500 rewards points!"

Although FIG. 1A and FIG. 1B include arrows representing the flow of data processing, other arrows and representations of possible paths of data are omitted for brevity/simplicity. For example, in some examples, the API 131 is utilized to obtain data from the customer interaction interfaces 105 and provide the data to a search orchestrator 141, as well as to interact with specialized components such as knowledge graphs and vector embeddings, thereby allowing the search orchestrator 141 to request and receive knowledge vectors. The search orchestrator 141 coordinates search processes including, for example, generating search queries, integrating search results from multiple sources, and/or ranking these results. The search orchestrator 141 also communicates with generative AI governance 151.

The generative AI governance 151 is, in some examples, a collection of frameworks, policies, or practices that are used by the backend computer system 117 to oversee the development or deployment of generative AI in concert with the enterprise AI platform 121. Coordination between the enterprise AI platform 121 and the generative AI governance 151 may enhance business processes and decision-making within an organization. For example, generative AI can be used by the backend computer system 117 to automatically generate text, images, and/or computer code, which can then be integrated with workflows of the enterprise AI platform 121 automate tasks, generate reports, and produce marketing materials. Generative AI can also create personalized experiences for customers that can be used by the enterprise AI platform 121 to enhance customer engagement and satisfaction with a product, good, or service.

Each of the components of the backend computer system 117 may be implemented as logical processes executed by the processors 115 and/or other processing units (e.g., one or more graphical processing units (GPUs)).

Figure 2:
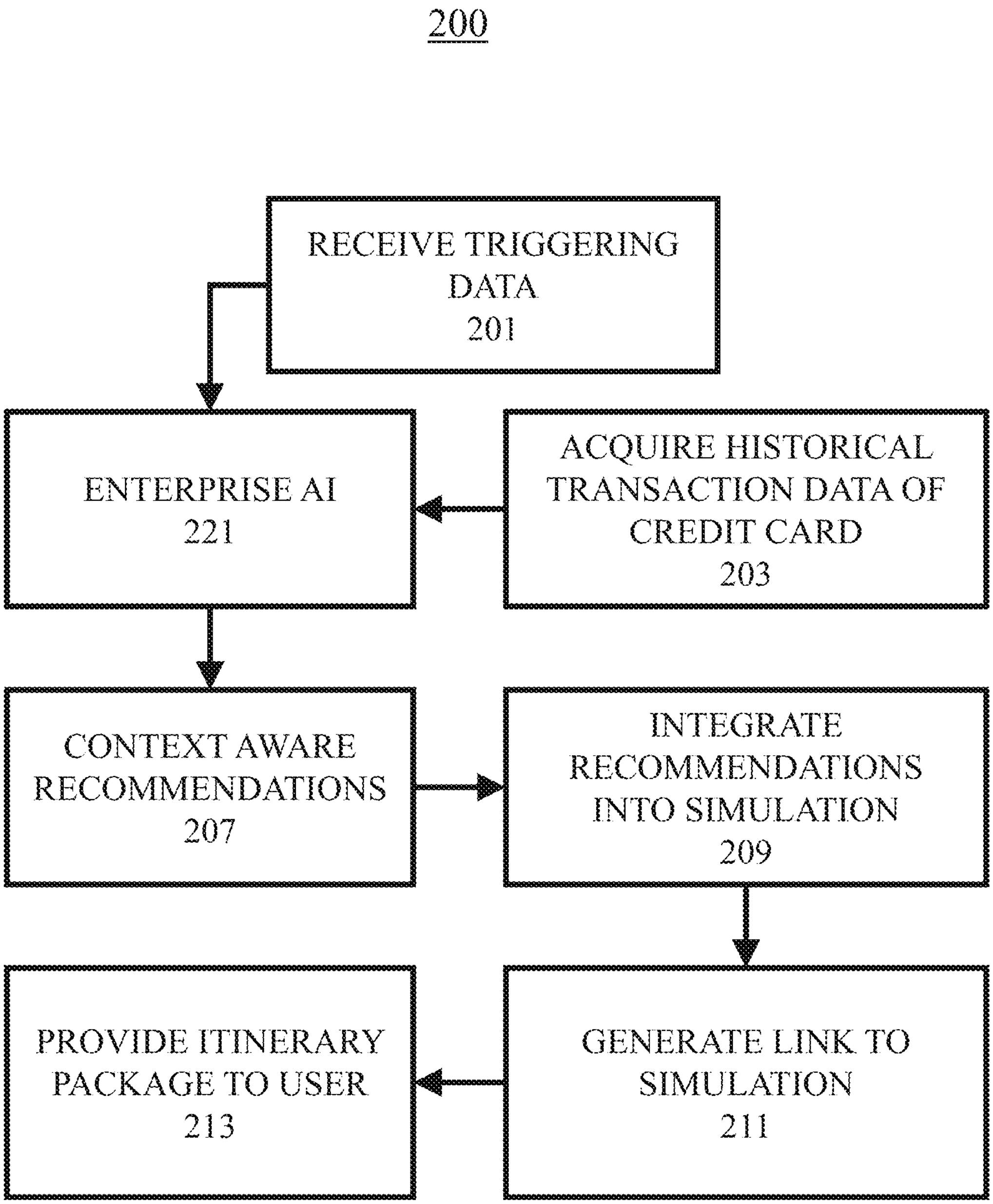
FIG. 2 shows a method of generating an interactive itinerary in accordance with an embodiment of the present disclosure.

FIG. 2 shows an example workflow 200 carried out using a computer system (e.g., the backend computer system 117) that includes a first step 201, a second step 203, a third step 207, a fourth step 209, a fifth step 211, and a sixth step 213. The workflow 200 begins upon the first step 201 where triggering data is received. The triggering data may include or describe one or more financial transactions or customer actions. In an example, the triggering data includes data representing a customer action where the customer has booked travel with a credit card associated or otherwise known to a backend computer system. For example, the backend computer system 117 may determine that the customer has made a purchase with a particular credit card via a signal received from the customer interaction interfaces 105. An enterprise AI platform 221 (e.g., the enterprise AI platform 121), prior to, commensurate with, or subsequent to the first step 201, acquires historical transaction data of the credit card in the second step 203. The enterprise AI platform 221 builds and/or updates one or more data models in the third step 207 based on the historical transaction data to learn or improve the accuracy of patterns represented in the transaction data.

The triggering data received in the first step 201 by the enterprise AI platform 221 may include one or more different points of proactive engagement with a customer. For example, the one or more points of engagement may include different points in time including before the customer has made a purchase, during a checkout process of a purchase (but before the transaction is completed), and after a purchase has been made (e.g., after checkout). The historical transaction data of the credit card acquired in the second step 203 may be used at any point to train data models that characterize customer usage patterns of their financial accounts (e.g., credit card purchases).

To proactively engage with a customer before they log on to a website or otherwise begin to shop or commence a purchase, for example, models trained on historical transaction data from the customer's previous purchases may be used by the enterprise AI platform 221 to anticipate or predict a reason for the customer's current activity (e.g., logging in to a website to purchase a certain type of item). Accordingly, the systems described herein may offer customers an immersive experience of their previous and/or potential future purchases based entirely on their historical transaction data. In an example, triggering data that prompts the generation of an immersive experience including an immersive itinerary may include data that is separate from transaction data. In another example, the triggering data may be data indicating a customer action (e.g., checking an email, opening an application, visiting a website) and the immersive experience is entirely or significantly based on historical transaction data without needing to account for any recent transactions or other purchases. Accordingly, a customer may immerse themselves in their previous transactions before making another purchase.

To proactively engage with a customer during an intermediary point in time of an overall transaction process, for example when an item for purchase is placed in an online shopping cart, systems described herein may offer customers an immersive experience based on their historical transaction data and/or based on one or models being re-trained or updated based on data triggering such an update (e.g., receiving data in the first step 201 indicating a customer has put an item in their online shopping cart).

To proactively engage with a customer after a purchase is placed using the customer's financial account (e.g., credit card), systems described herein may offer customers an immersive experience based on their historical transaction data, data received from an external or remote source, and/or one or models being re-trained or updated based on triggering data. The external or remote source may be, for example, customer activity on a third party website. In an example, the customer completes a transaction for purchasing an airline seat using their financial account. Through a website that offers travel activities or excursions (e.g., all-wheel offroad tour, parasailing, dinner reservation), a customer provides usage data (e.g., click activity, alphanumeric input in a chat interface) that is used to query models (e.g., knowledge vector generation) and/or retrain the models to provide an immersive experience that takes the customer through different seat upgrade options as well as personalized itinerary items such as an all-terrain vehicle (ATV) excursion after the customer lands at their destination followed by a dinner reservation at a restaurant serving a type of food they enjoy later that night.

The third step includes building data models from classification (e.g., support vector machines, Naïve Bayes, decision trees, logistic regression, K-Nearest Neighbors) and clustering algorithms (e.g., K-Means, Gaussian Mixture Models, Affinity Propagation) that process the transaction and/or other data related to a customer. The third step 207 also includes building and/or updating data models using filtering techniques including User Based Collaborative filtering (UBCF), Item Based Collaborative Filtering (IBCF), and/or content-based filtering. Some or all of these data models are utilized to generate recommendations for itineraries based on the context of the personal transaction data of the customer's financial account (e.g., credit card transactions).

A recommendation for a customer may be generated based on one or more multilayer perceptron (MLP) algorithms utilized by the enterprise AI platform to train data models in a supervised manner to predict a next step before a customer takes it. The MLP algorithm(s) may be utilized to develop models internally to train or continuously re-train data models representing customer activity patterns. In an example the MLP algorithm(s) are used to re-train a neural network-based model. The neural network-based model may be, for example a large language model. In some embodiments, at least one personalized recommendation is generated and added to an itinerary. Based on a user's history of behaviors, preferences, and patterns a recommendation is generated to appeal to that history. A personalized itinerary may include one or more recommendations. For example, if a user tends to rent a car when they travel to a particular airport, a data model may be trained or built using the filtering techniques described above to recognize that when the user has booked a plane ticket to that same airport, they likely would be receptive to an automatically generated itinerary that included a recommendation for a rental car.

Recommendations may be generated by different combinations of components in computer systems described herein. In an example, the enterprise AI platform 121 in combination with a stream inference engine incorporates a data model to generate and provide recommendations to a user. Other examples include one or both of the enterprise AI platform 121 and the stream inference engine generating a recommendation, which is then provided to a communication engine that sends the recommendation to the user. The recommendations may be provided via SMS or email, for example. The recommendations may also be provided to the user as being included in one or more itineraries. In other examples, the enterprise AI platform 121 includes the streamlining engine and performs one or more of UBCF, IBCF, content-based filtering using a neural network, and/or content-based filtering using machine learning.

After the recommendations are generated (thereby forming one or more itineraries), the recommendations are integrated into a simulation in the fourth step 209. The recommendations of the one or more itineraries are represented by digital information (e.g., data and/or program code). Accordingly, in the fourth step 209, the computer code representing the itinerary is merged with computer code that is executable to create a simulation environment (e.g., software that is compatible with a VR headset). The result of this merger may be software or computer program code that is stored for later retrieval.

In the fifth step 211, the enterprise AI platform 221 generates a link that when selected, begins a process of executing an immersive simulation of any of the itineraries associated with the link. In the sixth step 213, the link and associated data (e.g., an itinerary cost) are packaged together and sent over a network. One 'package' in this context may include one or more itineraries. In certain examples, multiple packages are sent over the network. In an example, after a user books travel with their credit card in the first step 201, the user is sent three packages to their email, as a text message, an email notification, a push notification, or the like, where each package contains a different itinerary. For example, if the user's transaction data indicates they may want to travel by plane, each package may include an itinerary with different hotels, car rental options, and so forth.

Figure 3A:
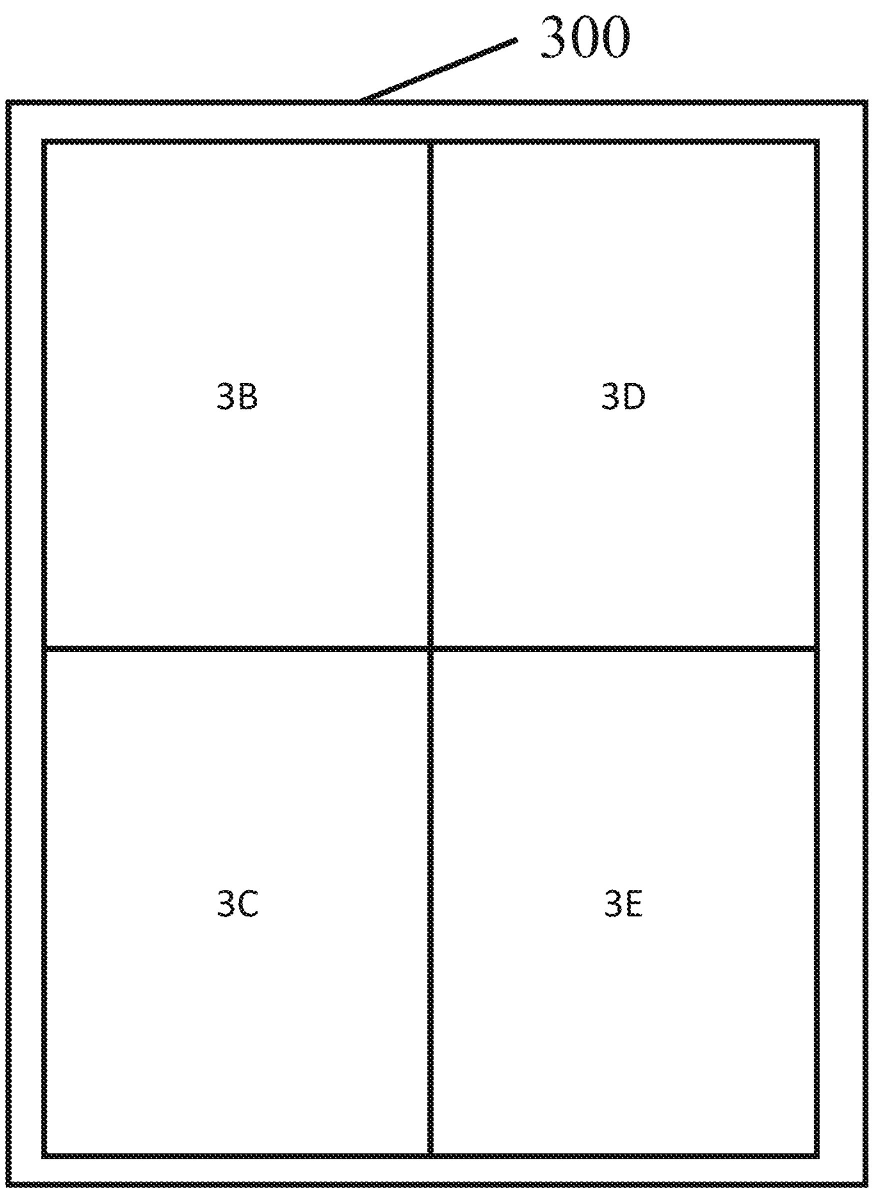
FIG. 3A shows a backend of a computer system and customer process as a combination of FIG. 3B, FIG. 3C, FIG. 3D, and FIG. 3E in accordance with an embodiment of the present disclosure.
Figure 3B:
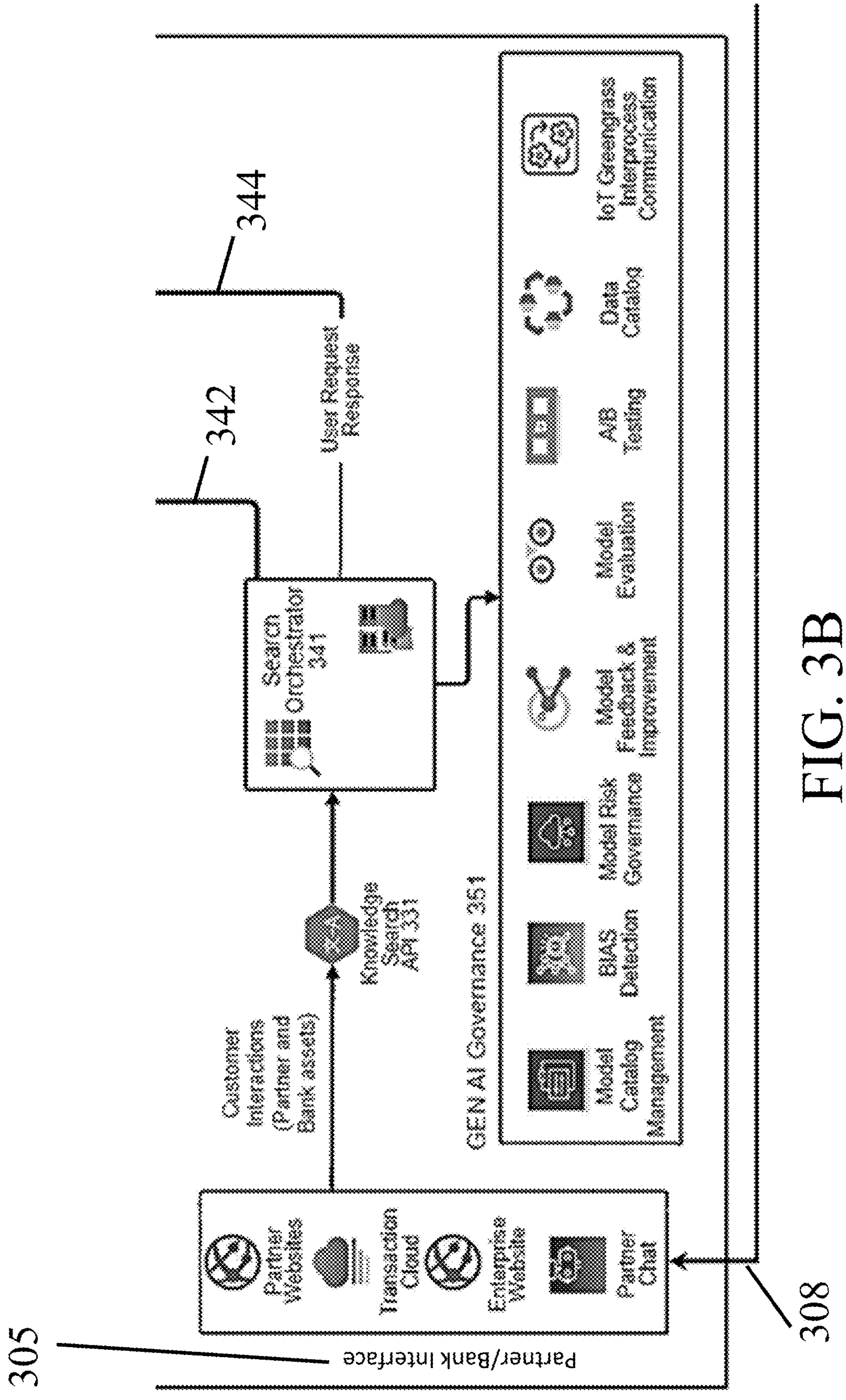
Figure 3C:
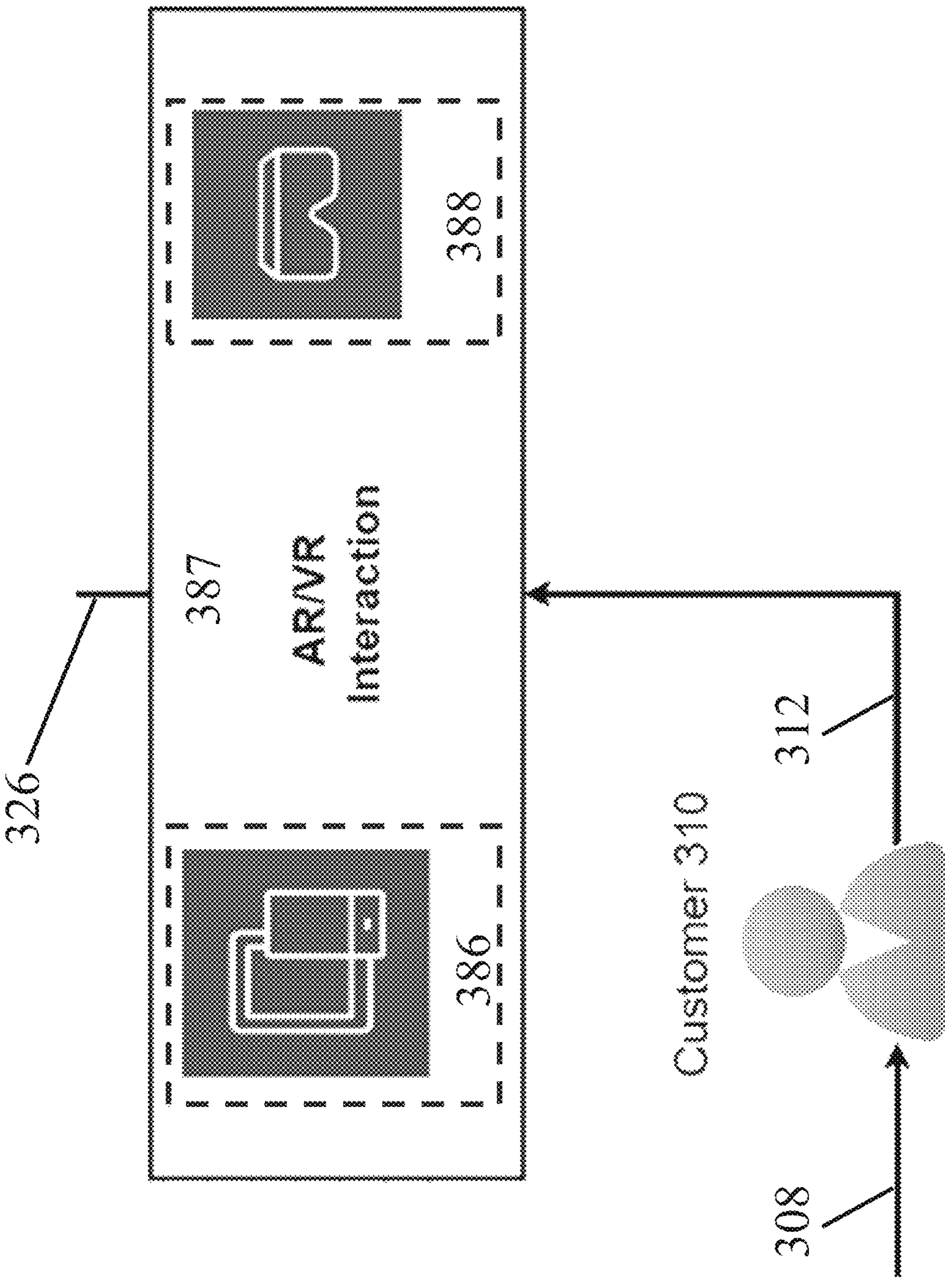
Figure 3D:
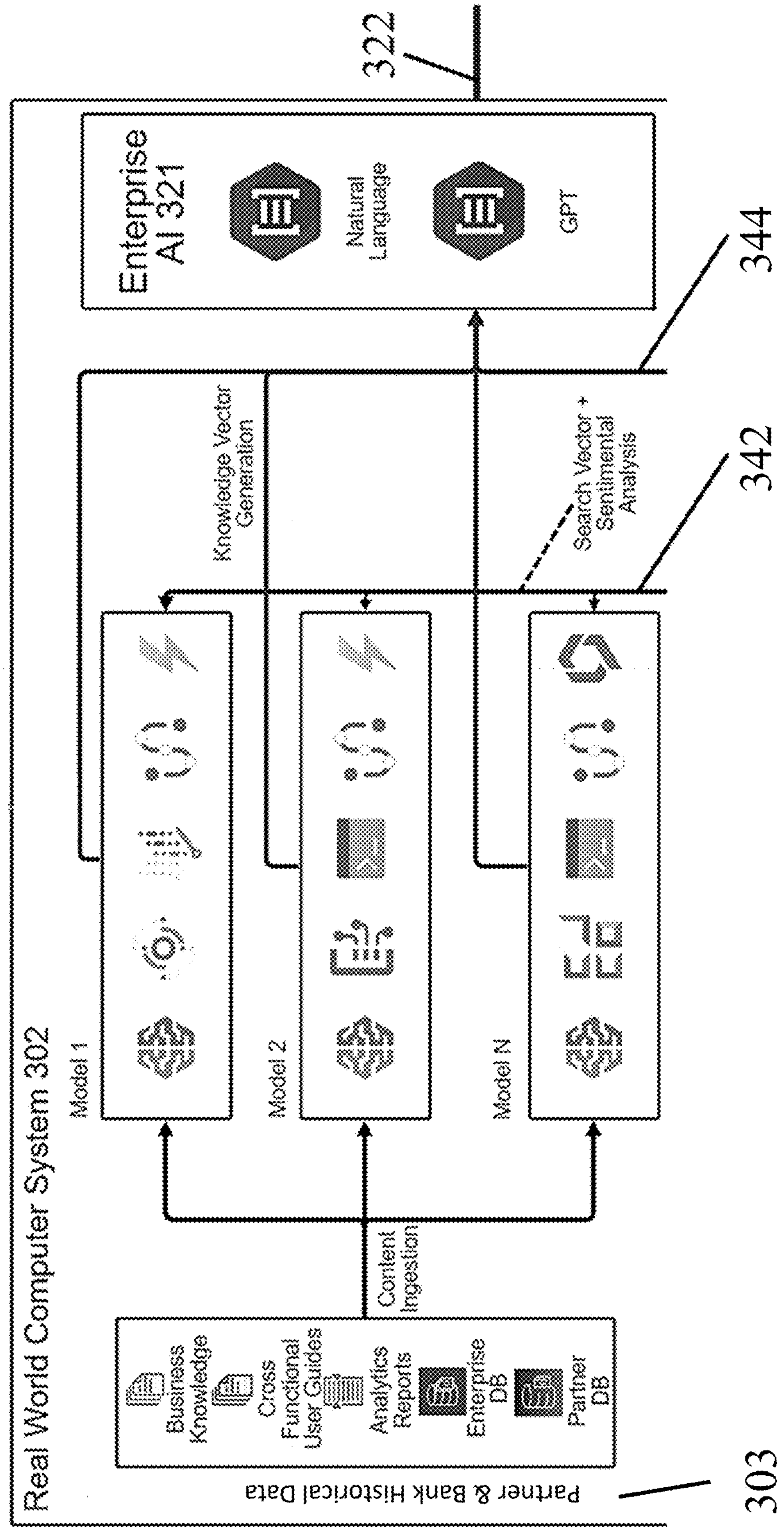
Figure 3E:
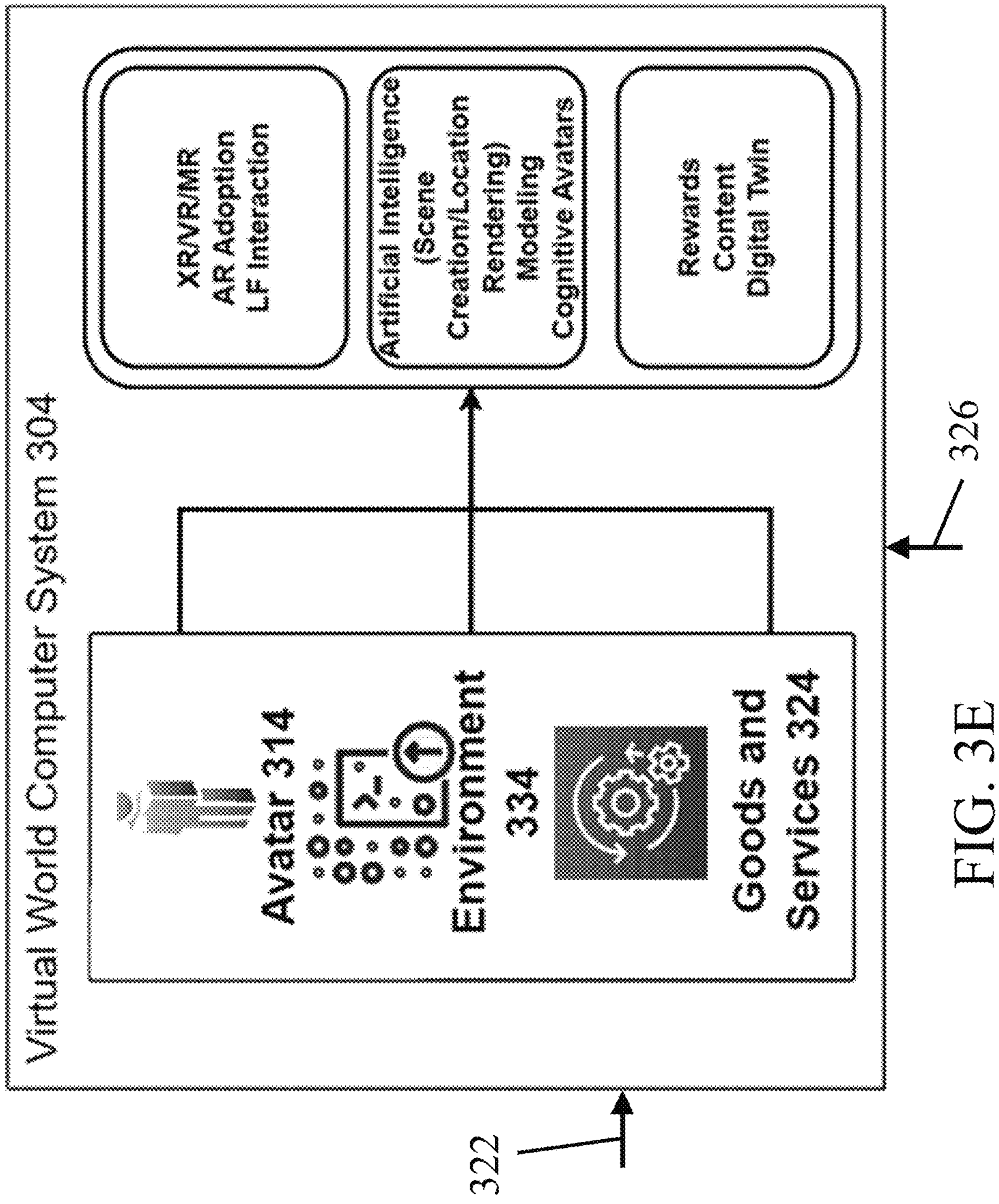

As another example of the techniques and embodiments described herein, a computer system 300 that includes back-end details and a customer process is shown in FIG. 3A. The system 300 is divided into four sections that when adjoined as shown in FIG. 3A, form the computer system 300 and describe the exemplary customer processes that follow. As shown in FIG. 3A, FIG. 3B abuts FIG. 3D on its right side and abuts FIG. 3C on the lower side of FIG. 3B, FIG. 3C abuts FIG. 3B on the upper side of FIG. 3C and abuts FIG. 3E on the right side of FIG. 3C, FIG. 3E abuts FIG. 3C on the left side of FIG. 3C and abuts FIG. 3D on its upper side, and FIG. 3D abuts FIG. 3B on its left side and abuts FIG. 3E on the lower side of FIG. 3D.

The system 300 comprises a real world computer system 302, a virtual world computer system 304, and a customer computer system 387 operated by a customer 310. Also included in the computer system 300 are historical transaction data sources 303, customer interaction interfaces 305, an avatar 314 of the customer 310, an enterprise AI platform 321, goods and services 324, an environment 334, a knowledge search API 331, a search orchestrator 341, generative AI governance 351, an AR-capable mobile device 386, a VR headset 388. The search orchestrator 341 communicates data (e.g., search vectors) to one or more models via a signal 342. The search orchestrator 341 also communicates with the one or more models via a signal 344 to, for example, query the one or more models and provide a response to a user request. Queries provided to the one or more models may be generated by the search orchestrator 341 by tokenizing data of, for example, a user request, into a knowledge vector provided to the one or more models. Each model may learn patterns of customer activity (e.g., spending patterns, preferences for types of products) represented by particular sets of tokens that provide different insights into a customer's preferences via knowledge vectors that are supplied to the one or more models by the search orchestrator 341 that generate outputs provided to the enterprise AI platform 321.

The customer 310 communicates with the customer interaction interfaces 305 via a signal 308 and communicates with the customer computer system 387 via a signal 312. The customer computer system 387 may include MR and/or XR interaction in addition to or in place of AR/VR interaction. The real world computer system 302 communicates with the virtual world computer system 304 via a signal 322. The virtual world computer system 304 may include at least one processor the executes instructions for implementing a platform or the environment 334 for hosting, modifying, or otherwise implementing the avatar 314 and the goods and services 324. The avatar 314 may be used as part of rewards, content, a digital twin, or any XR/VR/MR experience. In one example, the avatar 314 is hosted by the virtual world computer system 304 to provide an XR experience and/or a digital twin via a signal 326.

After booking travel or a purchase with a credit card of a financial services provider that is co-branded with a partner, the customer 310 receives a personalized itinerary and a link (e.g., the link 125) that is automatically generated by the enterprise AI platform 321. The auto-generated itinerary is based on the customer's past preferences from their own transaction data, paired with AI data on their destination, and one or more costs are displayed in dollars or available account points (e.g., reward points or tokens). Upon clicking the link (e.g., the first step 201), the customer 310 enters an immersive virtual world simulation executed by the virtual world computer system 304, utilizing their avatar 314 to personally experience different components of their upcoming trip. In some instances, the customer 310 enters the simulation without an avatar and experiences the simulation from a first person point of view. While in the immersive experience, the customer 310 can upgrade their bookings in real-time through tokens or other currency accepted within the virtual world that are converted to loyalty points, statement credits, or card transactions, for example. The personalized experience is powered by the enterprise AI platform 321 and offers associated with the customer's account may be automatically applied and made available to them in the simulation.

The techniques described herein are applicable across branded and co-branded consumer products, and are not limited to travel purchases. Customers, such as the customer 310, may either log into an existing avatar or create a new avatar, for example. Subsequently, the customer 310 may enter the simulated environment provided by the customer computer system 387 using a suitable device, such as the AR-capable mobile device 386 or the VR headset 388, for example. The avatar 314 of the customer 310 may be embodied with their unique physical features, including height, weight, and personal preferences.

The enterprise AI 321 hooks into the simulation to allow the customer 310 to experience the details of their transaction in an immersive manner. The customer 310 can experience a realistic simulation of how their booking in an airplane seat, cruise cabin, hotel room, or other itinerary item or recommendation would personally feel to them based on their height and weight, for example. The customer 310 can feel how far their reach will be into a recently purchased washer and dryer, for example, because the dimensions, model, color, and other characteristics of the graphical objects representing the washer and dryer are specified according to the customer's unique height, dimensions, and preferences.

While in the simulated experience, the enterprise AI platform 321 enables the customer 310 to get real-time travel upgrades and marketing offers with tokens, later converted to points or card purchases. Consequentially, the customer 310 may no longer miss out on creating the most comfortable experience possible, and will be able to utilize their loyalty program in a new way to maximize value received.

The enterprise AI platform 321 builds data models from classification and clustering algorithms on internal and partner customer data (e.g., card transactions, brand/loyalty preferences, travel dates and destinations). The backend computer system (e.g., the backend computer system 117) that includes the enterprise AI platform 321 will continuously learn and track activity of the customer 310 on partner websites and the provider's own platform.

A multivariate approach to designing a computer system capable of implementing the techniques described herein considers multiple variables or data points from various events to trigger and influence system responses. This approach enables such a system to handle complex scenarios where multiple conditions or event attributes must be analyzed together to make an informed decision and take appropriate actions. Leveraging multivariate data may be achieved using an event-driven architecture.

The system 300 may be implemented, at least in part, using a multivariate event-driven architecture to more easily facilitate the transfer of information between different applications and subsystems. However in some embodiments, systems described herein are not limited to event-driven architectures.

Data models of the system 300 may be built using User based collaborative filtering (UBCF), Item Based Collaborative Filtering (IBCF), and content based filtering integrated with deep learning (e.g., Neural network based autoencoders) making context aware recommendations based on card transaction data from the customer 310 and/or card transaction data from other customers.

Integrating generative AI with the virtual world 304 facilitates the customer 310 receiving their unique link automatically without human intervention. As soon as a card purchase triggers the real world computer system 302, the enterprise AI platform 321 activates to proactively and immediately offer personalized itinerary recommendations and an immersive experience link. In some embodiments, this technique can also be housed at the end of a co-branded partner checkout experience.

In certain embodiments, the immersive experience runs dynamic ads including rewards points earned on each purchase, based on the predictive models of the real world computer system 302 to carry out targeted marketing. This provides opportunities to add spend offers, such that the customer 310 can receive higher earn if they use their co-branded card while on their trip, for example.

The real world computer system 302 utilizes internal and partner databases accessed via the historical transaction data sources 303 and the customer interaction interfaces 305 including, for example, analytics reports, transactions, user guides, customer interactions, real-time website data, chat data, and business knowledge. This data may be obtained through a knowledge search API 331 and different machine learning models are trained in real-time using multiple combinations of algorithms for the enterprise AI platform 321.

The search orchestrator 341 facilities training the data models and provides real-time data to the models. In some examples, the real-time data is provided from user searches. If the customer is performing several searches on a partner's website and the provider's website, for example, the data will go into the models in real time.

Data models are executed to perform real-time data analysis and historical data analysis identify patterns of customer behavior, transaction classification, and so forth to generate models tailored to generate personalized itineraries. The models gain an understanding of what the customer 310 is trying to do if, for example, the customer is on several different checkouts at the same time. The real world computer system 302 can generate an AR/VR link during both customer checkout and after purchase via personal customer notification after checkout via email or text notification, for example. In some embodiments, depending on whether the customer 310 possess multiple devices capable of executing an immersive environment, a different link for each device may be provided and/or a link that provides an option to select which device the customer 310 would like to use. For example if the customer 310 has both the AR-capable mobile device 386 and the VR headset 388, the customer 310 can choose whether they want to use virtual or augmented reality integration based on a prompt asking the customer which device they prefer before entering the simulation.

The generative AI governance 351 performs model catalogue management by checking in on the models and monitoring bias detection. With model risk governance in place, if a model is at risk, the generative AI governance 351 is used to determine the steps needed to mitigate the risk. Accordingly, in some embodiments, data models are continuously refreshed to gain model feedback and make improvements by performing A/B testing, model evaluation, and updating a data catalog on which models will be trained. Upon the generative AI governance 351 completing one or more tasks, data may be automatically fed back into historical data that is stored internally.

Activity by the customer 310 in the virtual world 304 may feed directly into the enterprise AI platform 321. For example, if the customer 310 tends to interact with premium economy seating in the virtual world 304, the enterprise AI platform 321 will adapt accordingly and personalize recommendations. Particularly, the customer 310 may utilize their headset on a plane while sitting in a regular economy seat. By knowing the customer 310 purchased a regular economy seat and while sitting in it explored premium economy seating, valuable insights and marketing opportunities may be gained. Thus, the virtual world 304 is a dynamic environment where the customer 310 can truly explore their travel booking and destination attraction options before committing to purchasing a travel itinerary they will experience in the real world.

The virtual world computer system 304 may provide the customer 310 opportunities to purchase the goods and services 324, use benefits, loyalty points, and any other account offers. The currency in this virtual environment may be tokens which can then be converted to rewards points or card transactions at an account level.

The techniques described herein give partners (e.g., an airline) of a provider (e.g., a bank) a tool to market in this immersive customer experience in real-time, cross-promote products, and so forth. For instance, the tool may provide an offer to the customer 310 such as "spend X in virtual world token upgrades while on your flight and get 10× airline points." As another example, an offer may be "buy sunglasses inside the virtual world and we will cover the shipping cost to have them delivered to your home!"

At this point it should be noted that techniques for providing personalized and immersive itineraries in accordance with the present disclosure as described above may involve the processing of input data and the generation of output data to some extent. This input data processing and output data generation may be implemented in hardware or software. For example, one or more processors (e.g., CPU, GPU) executing instructions may implement the functions associated with backend operations and functions in accordance with the present disclosure as described above. If such is the case, it is within the scope of the present disclosure that such instructions may be stored on one or more non-transitory processor readable storage media (e.g., a magnetic disk, SSD or other storage medium), or transmitted to one or more processors via one or more signals embodied in one or more carrier waves. The software may be written in a programming language including one or more of, but not limited to, C, C#, C++, JavaScript, Python, Ruby, R, SQL, PHP and variants thereof. Embodiments described herein are not limited to these languages.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for providing an immersive simulation for an itinerary, the system comprising:

memory storing instructions; and at least one computer processor communicatively coupled to a network and configured to execute the instructions to:

acquire historical transaction data of a financial account for storage in a database of the system;

provide the historical transaction data to an enterprise artificial intelligence (AI) platform to train at least one data model that characterizes usage patterns associated with the financial account;

receive triggering data indicating a transaction involving the financial account for a product and/or service;

generate one or more personalized recommendations associated with the product and/or service based on the at least one trained data model, wherein the one or more personalized recommendations are included in an itinerary;

generate the immersive simulation by executing a simulation engine, the immersive simulation including the one or more personalized recommendations and a simulation program that is at least one of a Virtual Reality program, an Augmented Reality program, and a Mixed Reality program, wherein generating the immersive simulation comprises:

rendering, by the simulation engine, a context-aware graphical environment representing the product and/or service;

dynamically adapting, by the simulation engine, one or more rendering parameters of the context-aware graphical environment based on at least one of (i) real-time data received via an application programming interface (API), (ii) one or more characteristics of the device executing the simulation program, and (iii) one or more network conditions associated with delivery of the immersive simulation over the network; and integrating, by the simulation engine, the one or more personalized recommendations into the context-aware graphical environment as interactive graphical elements within the immersive simulation;

generate a link to the immersive simulation that is executable by a device; and provide at least one package over the network, the at least one package including the link and a cost associated with the itinerary.

2. The system of claim 1, wherein the device includes at least one display screen and is configured to execute the simulation program upon the link being selected.

3. The system of claim 2, wherein the device is one of a headset computer where the at least one display screen is positioned behind a lens, a tablet computer where the at least one display screen is a touchscreen, and a smartphone where the at least one display screen is a touchscreen.

4. The system of claim 1, wherein the at least one package includes a plurality of packages, the itinerary is included in a plurality of itineraries, and the at least one computer processor is further configured to execute the instructions to:

generate the one or more personalized recommendations for inclusion in the plurality of itineraries, at least one of the one or more personalized recommendations being different between each itinerary of the plurality of itineraries; and provide the plurality of packages over the network.

5. The system of claim 1, further comprising a data storage, wherein the at least one computer processor is further configured to execute the instructions to:

acquire the historical transaction data from the data storage; and acquire real-time data from one or more sources of customer interactions using an Application Programming Interface (API).

6. The system of claim 5, wherein the one or more sources of customer interactions include at least one of a chat interface, a website, and a platform for processing payments.

7. The system of claim 5, wherein the real-time data acquired by the API includes data generated from a plurality of user searches performed by a user.

8. The system of claim 1, wherein the at least one computer processor is further configured to execute the instructions to:

generate the cost in one or more of rewards points, a digital currency, and a fiat currency.

9. The system of claim 1, wherein the at least one computer processor is further configured to execute the instructions to:

provide the at least one package over the network as one or more of an email, a text, and a notification.

10. The system of claim 1, wherein the at least one computer processor is further configured to execute the instructions to:

generate the simulation program to include a graphical object and/or a graphical environment representing the product or service on the at least one display; and generate the graphical object and/or the graphical environment to correspond with a physical distance, pose, and size of the graphical object and/or the graphical environment.

11. The system of claim 10, wherein the graphical object and/or the graphical environment is a digital representation of one or more of an airline seat, a cruise ship cabin, a hotel room, or a vehicle, and the at least one computer processor is further configured to execute the instructions to:

adjust an appearance of the digital representation on the at least one display screen in real-time to correspond with a physical distance, pose, and size of the graphical object and/or the graphical environment.

12. The system of claim 1, wherein the enterprise AI platform executes one or more classification algorithms and one or more clustering algorithms, and the at least one computer processor is further configured to execute the instructions to:

provide the historical transaction data to the enterprise AI platform to train the at least one data model by applying the one or more classification algorithms and one or more clustering algorithms to the historical transaction data.

13. The system of claim 1, wherein the at least one computer processor is further configured to execute the instructions to:

provide the historical transaction data to the enterprise AI platform to train the at least one data model by applying a User Based Collaborative Filtering (UBCF) process and/or an Item Based Collaborative Filtering (IBCF) process.

14. A computer-implemented method for providing an immersive simulation for an itinerary over a network, the method comprising:

acquiring, by at least one computer processor communicatively coupled to and configured to operate in the network, historical transaction data of a financial account for storage in a database of the system;

providing, by the at least one computer processor, the historical transaction data to an enterprise artificial intelligence (AI) platform to train at least one data model that characterizes usage patterns associated with the financial account;

receiving, by the at least one computer processor, triggering data indicating a transaction involving the financial account for a product and/or service;

generating, by the at least one computer processor, one or more personalized recommendations associated with the product and/or service based on the at least one trained data model, wherein the one or more personalized recommendations are included in an itinerary;

generating, by the at least one computer processor executing a simulation engine, the immersive simulation, the immersive simulation including the one or more personalized recommendations and a simulation program that is at least one of a Virtual Reality program, an Augmented Reality program, and a Mixed Reality program, wherein generating the immersive simulation comprises:

rendering, by the simulation engine, a context-aware graphical environment representing the product and/or service;

dynamically adapting, by the simulation engine, one or more rendering parameters of the context-aware graphical environment based on at least one of (i) real-time data received via an application programming interface (API), (ii) one or more device-specific parameters of a device executing the simulation program, and (iii) one or more network latency conditions associated with delivery of the immersive simulation over the network; and integrating, by the simulation engine, the one or more personalized recommendations into the context-aware graphical environment as interactive graphical elements within the immersive simulation;

generating, by the at least one computer processor, a link to the immersive simulation that is executable by a device; and providing, by the at least one computer processor, at least one package over the network, the at least one package including the link and a cost associated with the itinerary.

15. The method of claim 14, wherein the at least one package includes a plurality of packages, the itinerary is included in a plurality of itineraries, and the method further comprises:

generating, by the at least one computer processor, the one or more personalized recommendations for inclusion in the plurality of itineraries, at least one of the one or more personalized recommendations being different between each itinerary of the plurality of itineraries; and providing, by the at least one computer processor, the plurality of packages over the network.

16. The method of claim 14, wherein the method further comprises:

acquiring, by the at least one computer processor, the historical transaction data from a data storage; and acquiring, by the at least one computer processor, real-time data from one or more sources of customer interactions using an Application Programming Interface (API).

17. The method of claim 14, wherein the method further comprises generating, by the at least one computer processor, the cost in one or more of rewards points, a digital currency, and a fiat currency.

18. The method of claim 14, wherein the method further comprises providing, by the at least one computer processor, the at least one package over the network as one or more of an email, a text, and a notification.

19. The method of claim 14, wherein the method further comprises providing, by the at least one computer processor, the historical transaction data to the enterprise AI platform to train the at least one data model by applying a User Based Collaborative Filtering (UBCF) process and/or an Item Based Collaborative Filtering (IBCF) process.

20. At least one non-transient processor readable storage medium storing a computer program of instructions configured to be readable by at least one processor for instructing the at least one processor to execute a computer process for performing the method of claim 14.

* * * * *